United States Patent
Creamer et al.

(10) Patent No.: US 7,512,949 B2
(45) Date of Patent: Mar. 31, 2009

(54) STATUS HUB USED BY AUTONOMIC APPLICATION SERVERS

(75) Inventors: Thomas E. Creamer, Boca Raton, FL (US); Bill H. Hilf, La Habra, CA (US); Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 10/654,094

(22) Filed: Sep. 3, 2003

(65) Prior Publication Data

US 2005/0050138 A1    Mar. 3, 2005

(51) Int. Cl.
*G06F 9/46* (2006.01)
*G06F 15/16* (2006.01)
*G06F 15/173* (2006.01)

(52) U.S. Cl. ............. 718/105; 718/104; 709/201; 709/203; 709/223; 709/226

(58) Field of Classification Search ......... 718/100–105; 709/238, 201–203, 223–226
See application file for complete search history.

(56) References Cited

U.S. PATENT DOCUMENTS

| 5,933,490 | A | | 8/1999 | White et al. | |
|---|---|---|---|---|---|
| 5,951,650 | A | * | 9/1999 | Bell et al. | 709/238 |
| 6,084,892 | A | * | 7/2000 | Benash et al. | 370/401 |
| 6,092,178 | A | | 7/2000 | Jindal et al. | |
| 6,141,686 | A | | 10/2000 | Jackowski et al. | |
| 6,219,706 | B1 | | 4/2001 | Fan et al. | |
| 6,324,580 | B1 | * | 11/2001 | Jindal et al. | 709/228 |
| 6,377,975 | B1 | * | 4/2002 | Florman | 709/203 |
| 6,385,636 | B1 | * | 5/2002 | Suzuki | 718/105 |
| 6,456,603 | B1 | | 9/2002 | Ismailov et al. | |
| 6,738,813 | B1 | * | 5/2004 | Reichman | 709/223 |
| 2003/0115259 | A1 | * | 6/2003 | Lakshmi Narayanan | 709/203 |
| 2004/0010588 | A1 | * | 1/2004 | Slater et al. | 709/224 |
| 2004/0199663 | A1 | * | 10/2004 | Horvitz et al. | 709/238 |

OTHER PUBLICATIONS

Brandt et al., "A Dynamic Quality of Service Middleware Agent for Mediating Application Resource Usage", pp. 1-11, IEEE, 1998.*

* cited by examiner

*Primary Examiner*—Meng-Ai An
*Assistant Examiner*—Jennifer N To
(74) *Attorney, Agent, or Firm*—Akerman Senterfitt (57) ABSTRACT

A method for serving applications including receiving a component status publication and acquiring a client request. The component status publication can specify a usage level for an application component. A server response for the client request can be selected from among a multitude of possible server responses based at least in part upon the component status publication. Each possible server response can differentially utilize application components. The client request can be response to by conveying the selected server response.

6 Claims, 4 Drawing Sheets

STATUS HUB USED BY AUTONOMIC APPLICATION SERVERS

BACKGROUND OF THE INVENTION

1. Technical Field

The present invention relates to the field of computer networking and, more particularly, to autonomic application servers.

2. Description of the Related Art

Computer systems are becoming so elaborate that system administrators and users are beginning to have difficulties managing their complexity. The concept of autonomic computing has been developed to address the problem of managing complexity within computing systems. Autonomic computing is a self-managing computing model named after, and patterned on, the human body's autonomic nervous system. An ideal autonomic computing system can control the functioning of computer applications and systems without input from the user, in the same way that the autonomic nervous system regulates body systems without conscious input from the individual. The goal of autonomic computing is to create systems that run themselves and are capable of high-level functioning while keeping the system's complexity invisible to the human operators.

Conventional application server infrastructures are not autonomic or self-managing systems. When particular segments of conventional application server infrastructures are overloaded, a bottleneck can be formed. Worse, the bottleneck can result in a cascading effect also called a domino effect. That is, when one component within the infrastructure experiences a bottleneck or system degradation, the other components which rely on or are attached to the bottlenecked component also suffer degradation. Eventually, the entire system falls into an increasing cyclic degradation loop until the system becomes nonfunctional. Once the cascading effect occurs, the entire system degrades even though only a few system components are actually overloaded.

The cascading effect is especially prominent within Web server architectures that have numerous critical components that can bottleneck the system. Further, Web browser users can excessively repeat commands whenever the processing of the original command is slow. The repeated commands, of course, only increase the processing requirements at the bottleneck causing the system performance to further degrade.

Conventional attempts to resolve the cascading effect are typically handled at the network or hardware level. That is, network traffic is automatically routed from a bottlenecked component to an alternative component that is approximately equivalent to the bottlenecked one. A hardware and/or network level solution, however, can result in the need for significant redundancies of expensive system components. Moreover, conventional solutions do not address the root causes of bottlenecks, which experience and industry analysis has proven to be attributable to the application layer of a computing environment in a large number of cases.

SUMMARY OF THE INVENTION

The invention disclosed herein provides a method, a system, and an apparatus for an application server that can be used within an autonomic framework. An autonomic framework can be a self-governing and self-modifying framework that can control complex computer systems without significant user intervention. The present invention can select server responses for client requests based upon current usage levels of application components, which generate the server responses.

More particularly, a multitude of application components that are registered with a centralized location, called a status hub, can convey component usage messages to the status hub. The status hub can assign a usage level for each registered application component based upon received component usage messages. The status hub can then publish the assigned usage levels as component status publications. The component status publications can be conveyed to one or more application servers that utilize the registered application components. Each application server can select appropriate server responses for incoming client requests based at least in part upon the component status publications. That is, the application server can select a server response that uses under utilized application components instead of over utilized application components, thereby preventing system bottlenecks from occurring.

One aspect of the present invention includes a method for serving applications within a multi-layered framework. The method includes receiving a component status publication and acquiring a client request. The component status publication can specify a usage level for an application component. A server response for the client request can be selected from among a multitude of possible server responses based at least in part upon the component status publication. Each possible server response can differentially utilize application components. The selected server response can then be generated and conveyed to the requesting client. In a particular embodiment, the application components can include local components and external components. It can be determined that a server response can be provided using either an external component or a local component. In such a case, the usage level of the external component can be compared with a predetermined usage threshold value. If the usage threshold value is exceeded, the local component can be used to provide the server response. Otherwise the external component can be used to provide the server response.

In one embodiment, the application components can subscribe to a centralized location that publishes the component status publications. Additionally, component usage messages can be transmitted from the application components to the centralized location for deriving the component status publications. In a further embodiment, a usage message format can be specified within the centralized location and the component usage messages can be formatted in accordance with the usage message format.

During the acquiring of the client request, the client request can be conveyed from a client browser through a proxy server to an application server. Further, the client request and the component status publication can be conveyed to a control layer of the application server. The control layer can call data methods contained within a data object layer of the application server. Application components can be utilized whenever the data methods are processed.

During the selecting of the server responses, a multitude of the server responses suitable for the client request can be identified. For each suitable server response, application component requirements for the server response can be determined and compared with available application components that have been determined from the component status publications. The server response can be selected based upon this comparison.

In one embodiment, an overload condition can be determined based upon at least one of the component usage messages. Responsive to the overload condition, the application server can be adjusted from a steady-state to an overload-state. If the application server is in the overload-state, the usage of specific application components can be limited with respect to the application components which triggered the overload condition. An end of the overload condition can also be determined based upon the component usage messages. Then, the application server can be adjusted from the overload-state to the steady-state.

Another aspect of the present invention can include an autonomic application serving system including an application server configured to receive client requests and selectively provide server responses. An application component monitor configured to transmit component usage messages for at least one application component can be included in the system. A status hub configured to receive the component usage messages from at least one communicatively linked application component monitor and responsively publish at least one component status publication to at least one application server can also be included in the system.

Each of the component status publications can specify a usage level for an associated one of the application components. Further, one of the usage levels can indicate an overload state. The status hub can be configured to provide at least one overload message whenever completion of the client request requires an application component that is in the overload state. In such a case, the server response can include the overload message.

In one embodiment, the application server can be a multi-layered application server configured to differentially provide the server responses to the client requests based at least in part upon the component status publications. The multi-layered application server can include a data object layer containing a multitude of data objects and data methods associated with the data objects. At least a portion of the data methods can utilize the application components. The multi-layered application server can also include an interface layer configured to incorporate data into a view object and format the view object for display within a client browser application. The view object can be included within the server response. The multilayered application server can further include a control layer configured to perform at least one controller action, such as parsing parameters, checking input, fetching data objects, and/or calling methods. The control layer can orchestrate the behavior of the data object layer and/or the interface layer based on the component status publications.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

Figure 1:
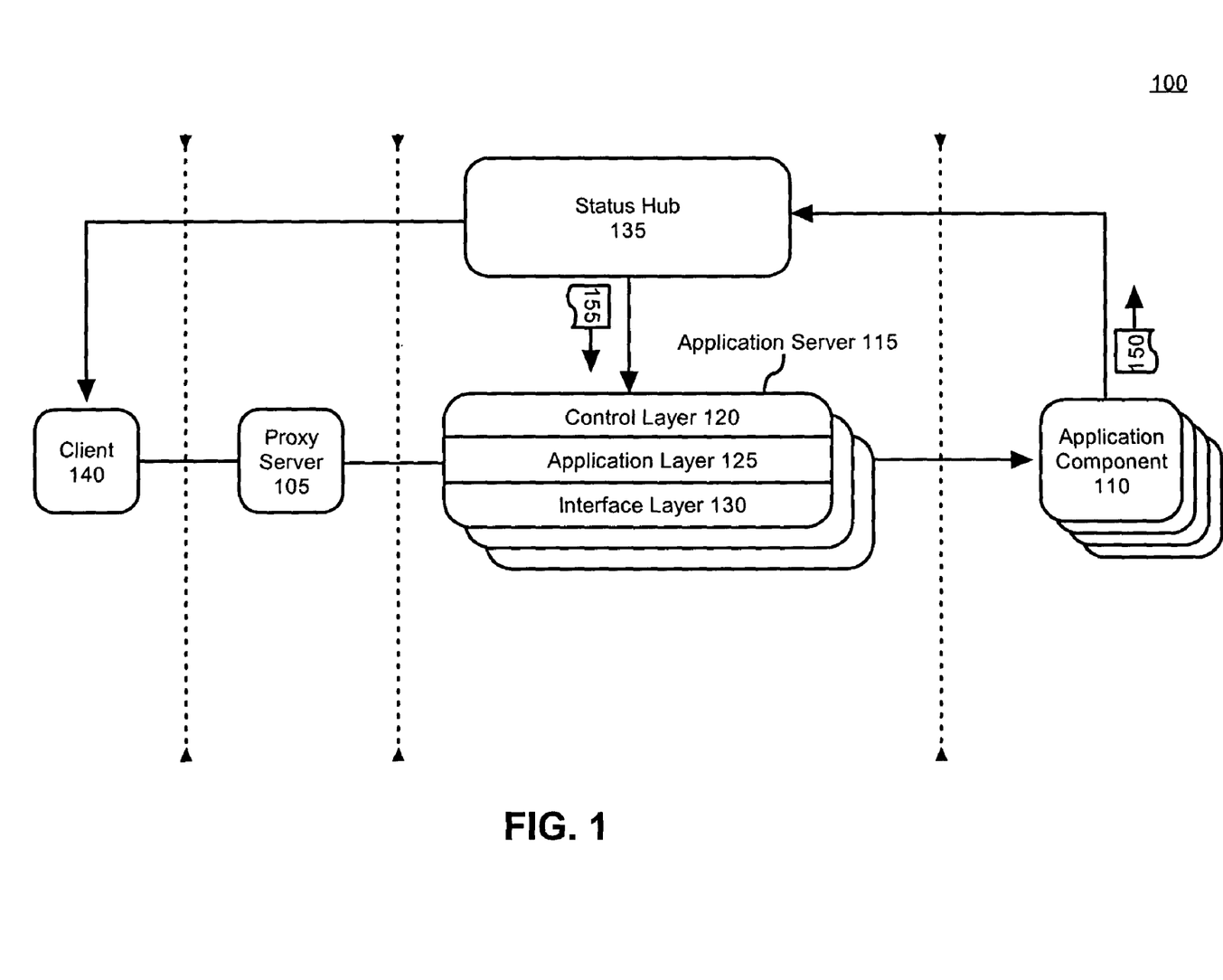
FIG. 1 is a schematic diagram illustrating an exemplary system including an autonomic application server in accordance with the inventive arrangements disclosed herein.

FIG. 1 is a schematic diagram illustrating an exemplary system 100 for serving applications in an autonomic fashion in accordance with the inventive arrangements disclosed herein. The system 100 can include a proxy server 105, an application component 110, an application server 115, and a status hub 135. The proxy server 105 can be an intermediary between a client 140 and the application server 115 performing such functions as security, administrative control, and caching. The proxy server 105 can include a gateway server that separates an enterprise network and/or intranet from outside networks. Additionally, the proxy server 105 can include a firewall, virus protection software, and the like.

The application component 110 can be a finite hardware and/or software resource used to perform a predetermined task. Each application component 110 can be a networked resource or local resource and can be triggered or utilized by one or more different calling programs. Each application component 110 can be used independently of other application components 110, can be used simultaneously with other application components 110, and/or can be used sequentially with other application components 110. Because each application component 110 represents a finite resource, however, each can cause a bottleneck in system 100 if over utilized.

More specifically, each application component 110 can be a computing service and/or computing application including, but not limited to, a directory service, a data management system, a text-to-speech application, a speech recognition application, a translation service, a transcription service, a Web service, and the like. Moreover, each application component 110 can be a software resource including, for example, a process instance, an application instance, a software library, a software object, and/or software routine. Each application component 110 can also be a hardware resource including, but not limited to, a permanent storage, a memory, processing cycles of a processor, a shared peripheral, and the like. However, the invention is not limited in this regard and any other suitable application component 110 can also be used.

The application server 115 can be configured to receive requests from clients 140 and selectively provide server responses to the client requests based in part upon appropriate application components 110 as determined from data provided by the status hub 135. Therefore, if a preferred application component 110 is busy, an alternative application component 110 can be used in its stead. The application server 115 can utilize a variety of dedicated application components 110 as well as a multitude of shared application components 110. The application component 110 can also be a local component or an external component.

In one configuration, each application server 115 can be segmented into several distinct layers or tiers. Within such a multilayered application server, the responsibilities of the application server 115 can be divided into functionally distinct areas. Each functionally distinct area can be implemented as a different software component. A distinct area of the server can be implemented as a software object using any of a variety of object oriented programming languages and/or development tools. Segmentation of the application server 115 can facilitate autonomic operations within the application server 115, as each functional segment need only handle a definable portion of autonomic server behavior. That is, functional segmentation can allow the application server 115 to be treated in a modular fashion and not in a monolithic one, thereby compartmentalizing the complexities within the application server 115 to facilitate software design.

The layers within the application server 115 can include, but are not limited to, a control layer 120, an application layer 125, and an interface layer 130. The control layer 120 can provide the process flow and control for the application server 115. The application layer 125 can perform data management and application specific processing tasks for the application server 115. The interface layer 130 can perform electronic document and interface formatting and presentation tasks for the application server 115.

The status hub 135 can be configured to receive usage messages from the application components 110 and to responsively publish a message specifying the usage level for the various application components 110. The status hub 135 can also normalize and/or standardize the received messages to a common scale. The status hub 135 can additionally determine whether or not an overload condition has occurred.

The status hub 135 can include a variety of different hardware and/or software elements depending on the manner in which it is implemented. For example, the status hub 135 can be a series of instructions embedded within a network router and/or hub. Alternatively, the status hub 135 can be a software object and/or software application disposed within a connected computing system.

Each usage message sent from one of the application components 110 to the status hub 135 can be called a component usage message 150. The component usage message 150 can include information about the activity of a given application component 110. The component usage message 150 can specify a portion of an application component 110 being used, a portion of an application component 110 available for use, and/or a percentage or fraction of an application component 110 resource being used. For example, the component usage message 150 can specify an amount of memory available, a percentage of processing power used, a number of users accessing an application component 110, a number of requests received within a specified time period, usage rates at which resources are consumed, and the like.

Each message published by the status hub 135 to the application servers 115 specifying the usage level of at least one application component 110 can be called a component status publication 155. The scale used to specify the usage level for the component status publication 155 can utilize any of a variety of gradations, such a numerical scales and scales based upon discrete values. For example, in one arrangement, the usage levels specified within the component status publication 155 can include scaled values within a range, such as integers from one to ten with one representing an unused state and ten representing fully used state. A configurable overload threshold within the range can also be established, wherein values over the overload threshold indicate an overload condition. In another example, specified usage levels can be discrete values such as minimal, low, normal, high, very high, maximum, and overload.

In operation, a client 140 can convey a client request, such as a HyperText Transfer Protocol (HTTP) request, across a network to the proxy server 145. The proxy server 145 can route the client request to the appropriate application server 115. The application server 115 can additionally receive at least one component status publication 155 from the status hub 135. The application server 115 can then selectively utilize at least one application component 110 when generating a server response to the client request. The application components 110 selected by the application server 115 can depend upon which application components 110 are available as determined from the component status publications 155.

From time to time, each application component 110 can convey a component usage message 150 to the status hub 135 that specifies activities occurring within the application component 110. The status hub 135 can use the component usage messages 150 to automatically generate, and subsequently publish, component status publications 155.

It should be noted that in one embodiment, the status hub 135 can include functions beyond those previously detailed. Two such functions include a registration capability and a format specification capability. If the status hub 135 has registration capabilities, it can register application components 110 and/or application servers 115. Once system 100 components are registered, secure communications between the status hub 135, the application components 110, and the application servers 115 can be established, thereby preventing unauthorized access and preventing hostile messages, such as viruses and Trojan horses, from invading the status hub 135.

Secure communications can be established through a variety of means known in the art, such as denying access from unauthorized locations, refusing messages from unregistered application components 110, conveying messages only to registered application servers 115, and through message encryption. Message encryption can include the use of public and private encryption/decryption keys. Additionally, the registration process can identify performance characteristics of an application component 110 and/or application server 115. For example, the registration process can specify the maximum bandwidth, the maximum number of simultaneous users, the total storage capability, and the like for a registered application component 110 and/or a registered application server 115.

If the status hub 135 has format specification capabilities, it can specify a message format to be used when conveying data to the status hub 135 and receiving messages from the status hub 135. That is, the component usage messages 150 received from the registered application components 110 as well as the component status publications 155 conveyed to the registered application servers 115 will be formatted in a manner specified within the status hub 135. While any message format can be specified by the status hub 135, a format such as the Extensible Markup Language (XML) that is specifically designed for communicating over standard network protocols, such as Transmission Control Protocol/Internet Protocol (TCP/IP), can facilitate data exchanges among system 100 components.

Figure 2:
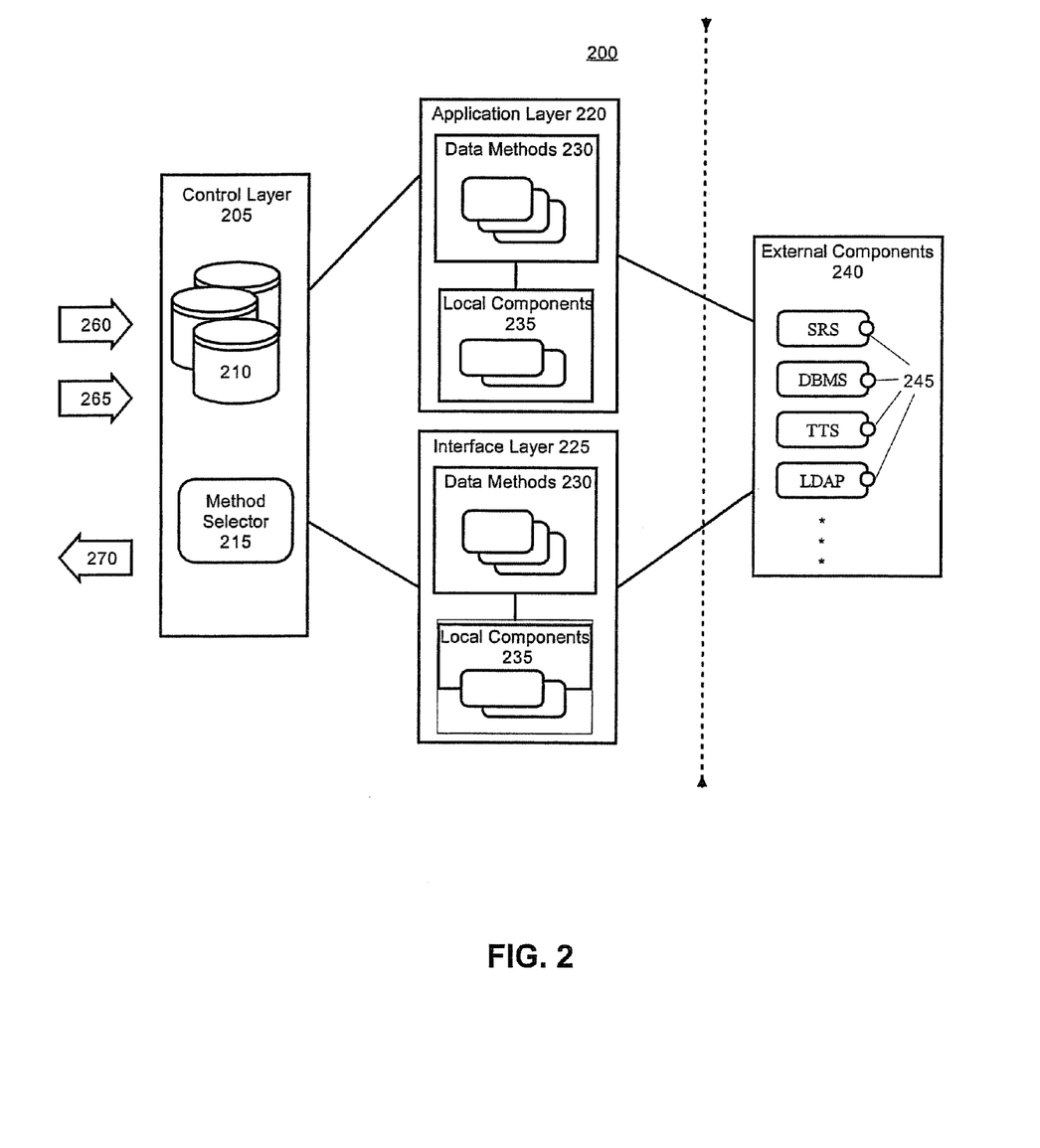
FIG. 2 is a schematic diagram illustrating an exemplary application server in accordance with the inventive arrangements disclosed herein.

FIG. 2 is a schematic diagram illustrating an exemplary application server in accordance with the inventive arrangements disclosed herein. The application server can include a control layer 205, an application layer 220, and an interface layer 225. The control layer 205 can provide the process flow and control for the application server. Specifically, the control layer 205 can receive client requests 260 and component status publications 265 and provide a server response 270. The provided server response 270 can represent a response that has been selected from a multitude of possible responses based at least in part upon available application components. Accordingly, the control layer 205 can be the application server component that is communicatively linked to the client and the status hub that receives messages from both the client and the status hub. The control layer 205 can function as a software-level resource manager that can automatically adjust resources to prevent system bottlenecks from occurring.

In one arrangement, the control layer 205 can include one or more data stores 210 and a method selector 215. The data stores 210 can contain any of a variety of tables containing present application component usage levels and a multitude of cross reference tables needed to properly select a particular server response. The tables within the data stores can be automatically maintained and populated using data from received component status publications 265 and can be manually modified using an administrative interface. The cross reference tables need not actually be stored as tables, but can be stored in any form, so long as suitable data for deciding among potential server responses is contained therein. For example, the data stores 210 can contain a listing of possible server responses for particular types of client requests. The data stores 210 can also contain a list of methods within the application layer 220 and/or interface layer 225 that can be called to generate each possible server response. Additionally, the data stores 210 can include tables for the various application resources required whenever a particular method is called. The data stores 210 can further include tables for the various application resources required for generating each possible server response.

The method selector 215 can determine the different possible server responses for each client request 265, select a particular server response, and call methods to generate the selected server response. The selection of a particular server response can be based at least in part upon the availability of the various application resources. For example, the method selector 215 can select between a local application resource and an equivalent external application resource based upon the usage level of the external application resource.

The application layer 220 can perform data management and data processing tasks for the application server 200. Exemplary data management and processing tasks can include data inputting, data seeking, data analysis, computations based upon data, data mining, and the like. The application layer 220 can include several data methods 230 that can be externally called from the control layer 205. Each data method 230 can perform a predetermined function using a variety of application components including both local components 235 and external components 240.

External components 240 can include computing services and/or computing applications communicatively linked to the application layer 220 and/or the interface layer 225 of the application server yet disposed in a location remote from the application server. For example, external components 240 can include, but are not limited to speech recognition components, text-to-speech components, directory assistance components like Lightweight Directory Assistance Protocol (LDAP) components, database management system components, interactive voice response components, web services, transcription services, and the like.

Local components 235 can be application components local to the application server configured to perform computing services in a fashion similar to the external components 240 listed above. That is, local components 235 can be redundant to and functionally equivalent with external components 240. Often, however, local components 235 will often be less robust than their external component 240 counterparts, so that the external component 240 can be preferred over the local component 240.

For example, a local speech recognition component can have a recognition accuracy less than an external speech recognition component since the external speech recognition component can have a larger speech grammar and perform more complex functions than the local speech recognition component. In another example, a local and an external text-to-speech component can each utilize different text-to-speech models, with the local text-to-speech component focusing on resource efficiency and the external text-to-speech component focusing on the most human-sounding results. Thus, the local text-to-speech component can utilize a format approach and the external text-to-speech component can utilize a concatenative approach. In yet another example, a local cache memory for content containing previously acquired external content can be a local component 235 and the external content source can be the corresponding external component 240. In still another example, a local database table can contain a local copy, periodically updated, of an external database table. Similarly, the local database table can be a cache memory for content received from the external database. Thus, the external database table will contain more updated records than the local database table, but the local database table will not consume external resources.

In one arrangement, selected application components can be associated with one or more application component monitors 245. Each of the application component monitors 245 can be configured to monitor activities of an associated application component. The application component monitor 245 can then generate component usage messages specifying the usage of the associated application component. Once generated, the component usage messages can be conveyed to the status hub.

The application component monitor 245 can include hardware and/or software elements and can be integrated within or can be external to the application component with which it is associated. For example, the application component monitor 245 can be a software routine or series of software routines that tracks key activity usage parameters as discussed, thereby determining the manner in which a particular application component is being utilized. In another example, the application component monitor 245 can be an external hardware device that can be attached to a network line to determine the data transfer load within the network line.

The interface layer 225 can perform document formatting and presentation tasks for the application server. The interface layer 225 can dynamically generate electronic documents using included data methods 230 and associated application components. The interface layer 225 layer can also incorporate data resulting from the application layer 220 into electronic documents as directed by the control layer 205. For example, if the application server is a Web server, the interface layer 225 can control the content and appearance of a dynamically generated Web page using technologies such as Java Server Page (JSP) technology, Active Server Page (ASP), and the like. In another example, the interface layer 225 can utilize a multitude of electronic document templates, such as HTML templates, to generate suitably formatted electronic documents. While the interface layer 225 can contain document formatting logic, the interface layer 225 and components and methods therein generally contain limited process control capabilities since the process control for the application server is generally performed within the control layer 205.

Figure 3:
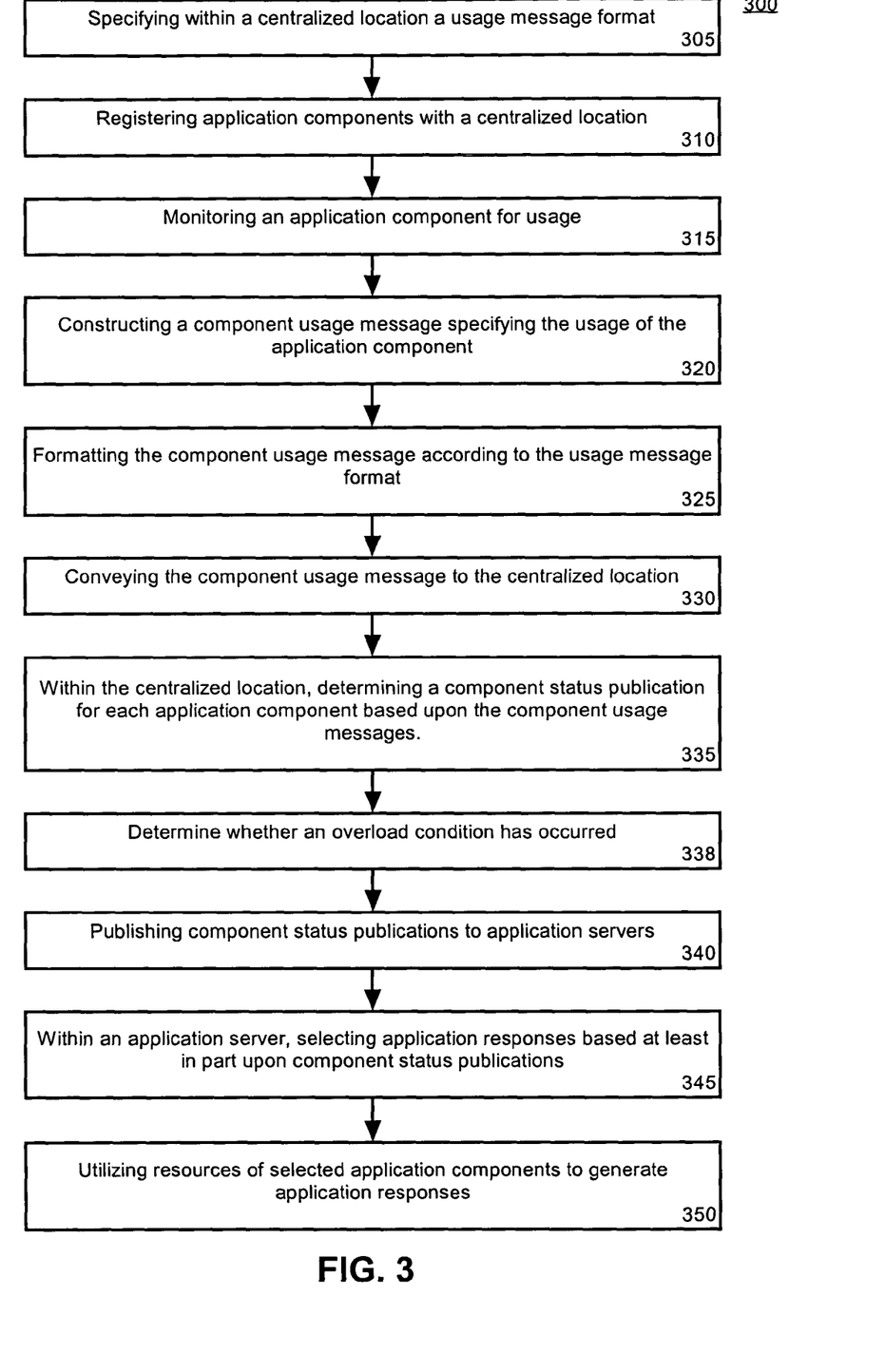
FIG. 3 is a flow chart illustrating a method of serving applications based upon usage levels of application components using the system of FIG. 1.

FIG. 3 is a flow chart illustrating a method 300 of serving applications based upon application component usage levels using the system of FIG. 1. Method 300 can be performed in the context of an autonomic computer system, such as a self-modifying Web architecture. Method 300 can begin in step 305 where a usage message format can be specified within a centralized location. In step 310, application components can subscribe to the centralized location. For example, the application component can be automatically recognized when attached to an autonomic system using a technology like Universal Plug and Play (UPnP). Once recognized, application components can automatically receive the format for the usage messages. Alternatively, an administrator can explicitly register the application component with the centralized location. In 315, the application component can monitor usage level. Usage level can be specified in any manner including, but not limited to, utilized capacity of the application component, available capacity remaining in the application component, percentage of the application component's capacity utilized, present traffic handled by the application component, and the like. In step 320, the monitored usage level of the application component can be specified within a component usage message. In step 325, the component usage message can be formatted according to the usage message format specified within the centralized location.

In step 330, the component usage message can be conveyed to the centralized location. In step 335, within the centralized location, a component status publication can be determined for each application component based upon the component usage messages. If an application component is registered with the centralized location then the general capacities of the application component can be known and the component usage message need not specify a relative capacity used verses available capacity. For example, if a component usage message specifies 20 gigabytes has been used, and the centralized location knows the application component has a capacity of 60 gigabytes, then the application component is one third utilized.

Algorithms and/or tables can exist within the centralized location that convert the usage information received from various application components to a standardized scale. Thus, the differences between different application components can be reconciled. For example, a memory statistic from a Linux server and a comparable memory statistic from a Solaris and/or Windows server can be mapped to a common scale. Additionally, network usage statistics from different types of routers can be translated into data points within a common scale.

Further, any of a variety of techniques can be utilized to prevent an anomalous or unusual component usage message from having a disproportionate effect on standardized usage level computations. For example, component usage messages that represent intermittent spike conditions can be disregarded when computing the standardized usage level. In another example, incoming component usage messages can be averaged over a predetermined time span and the standardized usage level can be determined based on the resulting averaged values. Such averaging can result in relatively stable usage levels being calculated as opposed to ones that erratically oscillate about a range based on individual component usage messages.

In step 338, based upon the standardized usage level, the status hub can determine whether an overload condition has occurred. In determining whether an overload condition has occurred, usage level can be compared to a previously established overload threshold. If the usage level exceeds the overload threshold, the application component can be in an overload state. Special processing can occur for the duration of the overload state in order to return the system back into a normalized-state as rapidly as possible.

Additionally, the centralized location can manage hystereses conditions in order to prevent overly cyclic behavior. In this context, hystereses refers to adjusting a system state responsive to incoming component status messages with such rapidity that temporary peaks and/or troughs in usage are unduly compensated for. Hystereses conditions can be managed using any of a variety of known techniques. For example, shifting from a normal operating condition to an overload condition may require that the overload threshold is exceeded and sustained for a predetermined time. Similarly, shifting from an overload condition to a normal operating condition can require the usage drops below the overload threshold and is sustained below the overload threshold for a sustained period.

In step 340, the centralized location can publish the component status publications to one or more application servers. In step 345, within the application server, server responses can be automatically selected based at least in part upon the component status publications. In step 350, the application server can utilize resources of selected application components to generate server responses.

Figure 4:
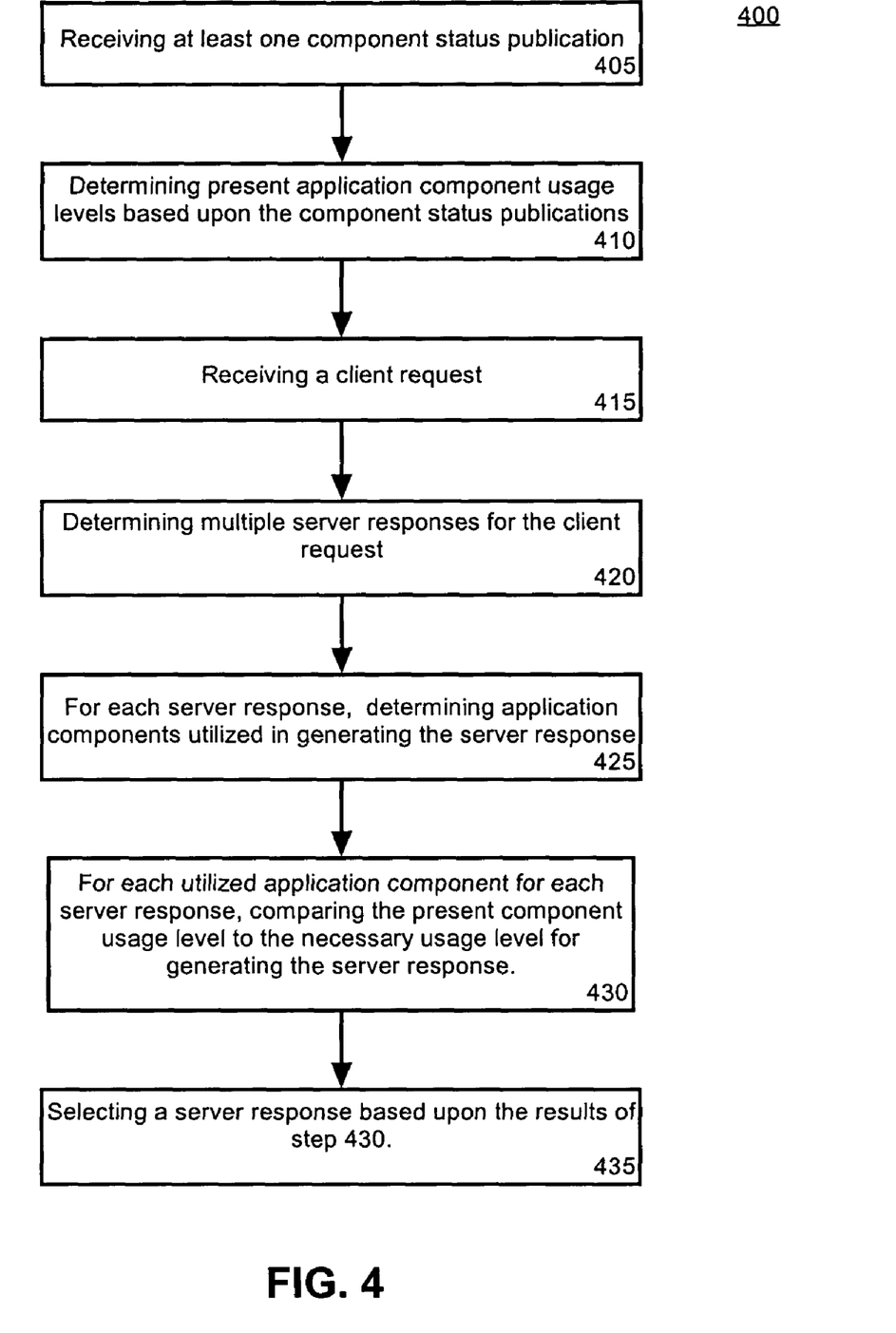
FIG. 4 is a flow chart illustrating a method of selecting and triggering server responses in accordance with the inventive arrangements disclosed herein.

FIG. 4 is a flow chart illustrating a method 400 of selecting and triggering server responses in response to component status publications and client requests. Method 400 can be performed in the context of an application server disposed within an autonomic computing system. The method 400 can begin in step 405 with the receipt of at least one component status publication, wherein a component status publication denotes a standardized usage level for at least one application component. In step 410, a present application usage level can be determined based upon the component status publications. That is, an application server receiving the component application publication can parse the message to extract the contained usage level. The application server can then denote the usage level using appropriate internal parameters. In a multilayered application system, the control layer responsible for process flow and application control can receive the component status publication.

In step 415, a client request can be received. The client request can be sent via a network directly from a client and/or can be conveyed from a client to a proxy server and then to the application server. In a particular embodiment, the client request can be sent from a Web browser, through a Web server, to the application server. In step 420, multiple potential server responses can be determined for the client request. Potential responses can be determined using a database, a table, parameters, and/or algorithms that cross reference potential responses and client requests. In one embodiment, a client request can be first categorized as a request type, such as database query, storage request, information request, access request, and the like. The request type can then be used to determine potential responses. For example, potential responses to a database query can include respond using local data, respond using network data, and deny database inquiry.

In step 425, for each potential server response, the application components utilized in generating the server response can be determined. Various databases, tables, parameters, and/or algorithms can be used to cross reference a potential server response with application components utilized within the response. If a multilayered application server is used, each potential server response can result in one or more methods being called from a control layer to a data layer. Each method can have one or more associated application components.

In step 430, for each necessary application component a present component usage level can be compared to the necessary usage level for generating the potential server response. A numerical value can be assigned to the cost of utilizing a particular application component, with over utilized components having a higher relative cost than under utilized components. Overloaded components can have a prohibitive cost.

In step 435, a server response can be selected based upon the results of step 430. In one arrangement, a total cost value for providing a server response can be the sum of all individual application component costs. The selected server response can be the response with the lowest total cost value. Moreover, adjustments can be made to the total cost value of different server responses to specify a relative preference for one potential response over another. The invention is not limited to one selection scheme for determining the server response, however, and any technique known in the art can be used.

For example, if two substantially identical data base management systems (DBMS's) exist, one of which is overloaded, the other under loaded, then the application server can select the under loaded DBMS to generate a server response. If a total cost value is used by the application server, the under load DBMS will have a lower total cost value than the overloaded DBMS. In another example, a server response can require a speech recognition (SRS) component, a directory look-up (LDAP) component, and a DBMS component. Multiple ones of each application component can be available, including both local and external components. A total cost value can be computed for each required component, and one component of each type can be selected. For instance, a local SRS component, an external LDAP component, and an local DBMS component can be utilized to generate a particular server response.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for serving applications comprising the steps of:
   receiving from a centralized location at least one component status publication generated based upon activity information specified in at least one component usage message generated by at least one application component, each said component status publication specifying a usage level for the application component, wherein each said component usage message is generated after a predetermined period of time and is automatically delivered to the centralized location, wherein said component message specifies the activity information for the application component, and wherein the activity information specifies at least one among a number of users accessing the corresponding application component, a number of requests received by the corresponding application component within the predetermined time interval, and a rate at which resources of the corresponding application component are used, wherein said component status publication specifies a state of said at least one application component, wherein said centralized location determines the state based upon at least one of said component usage messages, wherein responsive to an overload condition, said centralized location adjusts the specified state of said application component in said component status publication from a steady-state to an overload-state, and wherein responsive to an end of said overload condition, said centralized location adjusts the specified state from the overload-state to the steady-state;
   acquiring a client request to execute one or more computing tasks, wherein said computing tasks include at least one among a data processing task and a data management task;
   selecting a server response for said client request from among a plurality of possible server responses to execute said computing tasks based at least in part upon said component status publications, wherein each possible server response differentially utilizes application components to execute said computing tasks, and wherein said selecting further comprising:
      determining that a server response to execute said computing tasks can be provided using either one of said external components or one of said local components;
      comparing an usage level of said external component specified in said component status publication with a predetermined usage threshold value; and
      if said usage threshold value is exceeded, using said local component to provide said server response for executing said computing tasks, otherwise using said external component to provide said server response for executing said computing tasks; and
   responding to said client request with said selected server response.

2. The method of claim 1, further comprising the step of registering each of said application components with the centralized location that publishes said component status publications.

3. The method of claim 1, further comprising the steps of:
   specifying within said centralized location a usage message format; and,
   formatting said component usage messages in accordance with said usage message format.

4. The method of claim 3, said method further comprising the steps of:
   receiving said client request and said at least one component status publication in a control layer;
   calling from within said control layer a data method contained within an application layer; and,
   activating at least one of said application components responsive to said calling step.

5. The method of claim 1, said selecting step further comprising:
   identifying said plurality of server responses for said client requests;
   for each of said server responses for executing said computing tasks, determining a required utilization for each application component that generates said server response;
   comparing said required utilizations with available application component capacity, wherein said available application component capacity is determined at least in part from said component status publications; and,
selecting said server response based at least in part upon said comparing step.

6. The method of claim 1, said selecting step further comprising:

if said application component is in said overload-state, selecting the server response that limits usage of said application components which triggered said overload condition.

* * * * *